2 Sheets--Sheet 1.

C. D. REED.
Corn-Harvester.

No. 166,633. Patented Aug. 10, 1875.

Witnesses:
Alex Mahon
John G. Center

Inventor:
Charles D. Reed
by A. M. Smith
Attorney

N. PETERS, PHOTO-LITHOGRAPHER, WASHINGTON, D. C.

C. D. REED.
Corn-Harvester.

No. 166,633. Patented Aug. 10, 1875.

Witnesses:
Alex Mahon
John G. Center

Inventor:
Charles D. Reed,
by A. M. Smith
Attorney

UNITED STATES PATENT OFFICE.

CHARLES D. REED, OF POLO, ILLINOIS.

IMPROVEMENT IN CORN-HARVESTERS.

Specification forming part of Letters Patent No. 166,633, dated August 10, 1875; application filed April 26, 1875.

*To all whom it may concern:*

Be it known that I, CHARLES D. REED, of Polo, county of Ogle and State of Illinois, have invented certain new and useful Improvements in Corn-Harvesters, of which the following is a full, clear, and exact description, reference being had to the accompanying drawings making part of this specification, in which—

Figure 1:
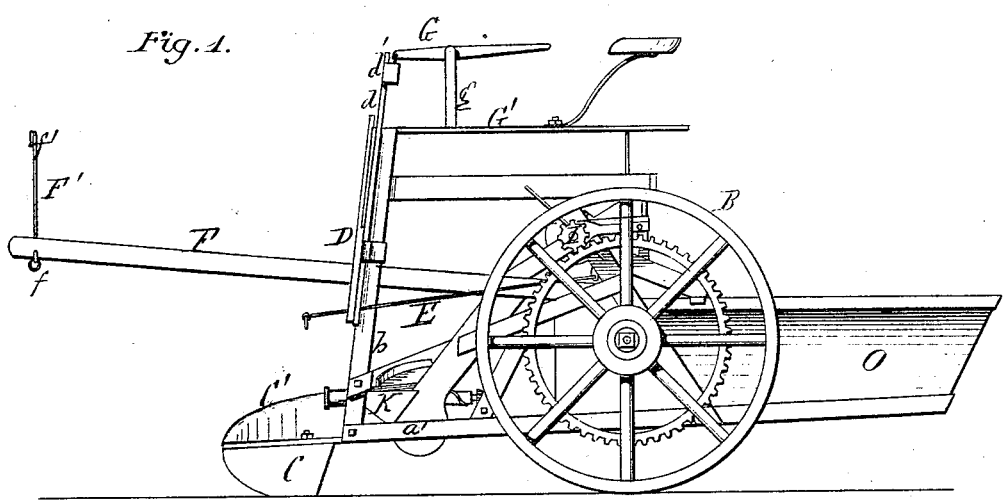
Figure 2:
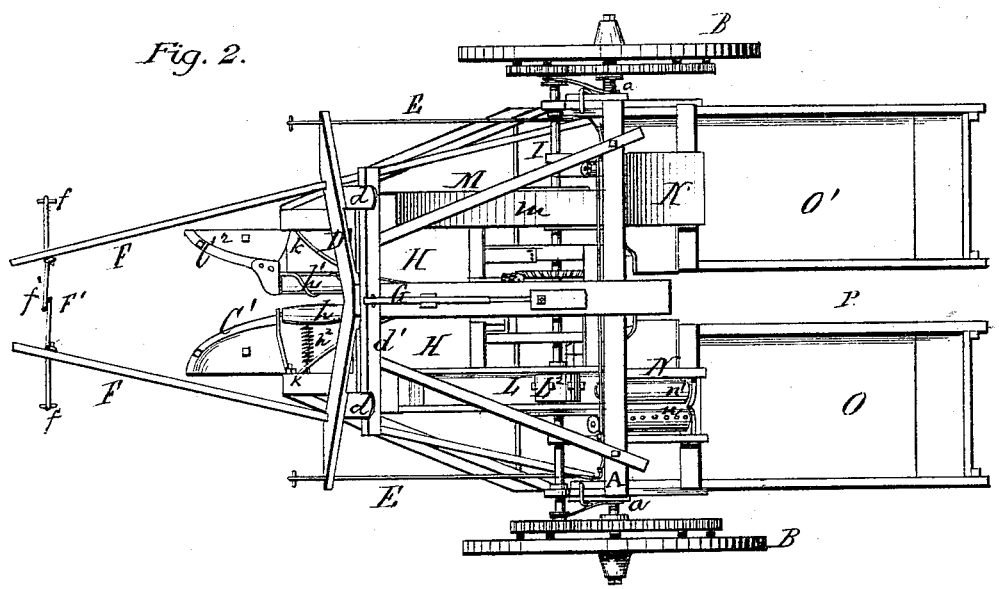
Figure 3:
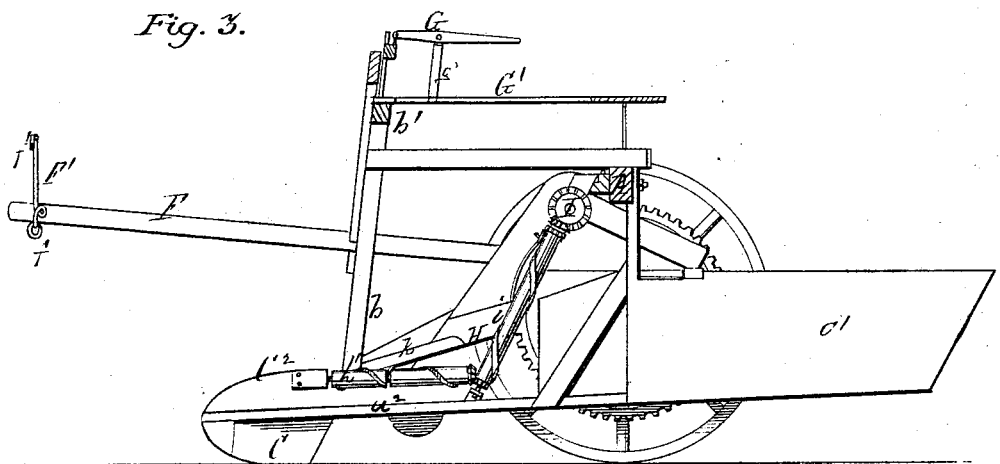
Figure 4:
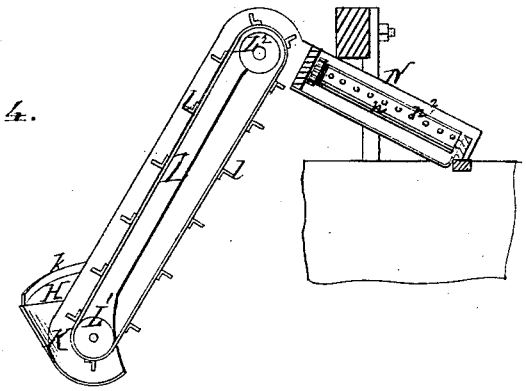

Figure 1 represents a side elevation of my improved machine. Fig. 2 is a plan or top view. Fig. 3 represents a vertical longitudinal section through the same, and Fig. 4 represents a section through the elevator and husker detached.

Similar letters of reference denote corresponding parts of the machine in all of the figures where used.

The machine, in its general organization, is similar to others in use; and differing as it does only in details, looking to its increased practical efficiency in operation, the description will be mainly confined to points wherein it differs from others, and which will be best understood from the following description with reference to the drawings.

The main axle of the machine, on which the carrying and driving wheels B B are mounted, is made in crank form, either in one piece or by the employment of angular axle-plates $a\ a$, connected to an elevated axle-bar, A, for giving sufficient elevation to the central portion of the axle to enable the corn-stalks to pass uninjured under said axle. To this axle-bar the main frame is secured, the axle-bar forming a part of said frame, which otherwise is composed of longitudinal sills in pairs, $a^1\ a^2$, connected at their forward ends with uprights $b$, which are united at their upper ends only by a transverse bar, $b'$, leaving the lower ends disconnected for the passage of the stalks and corn between them. These sills and uprights are connected with and braced from the main axle A in any suitable manner. The inner adjacent sills $a^2$ extend forward of the uprights $b$, and have runners C at their forward ends, adapting them to rest upon and to run lightly and easily over the ground; and over these runners are placed gathering fingers or guards $C^1\ C^2$, which converge from front to rear for gathering in the corn to the stripping devices hereinafter described.

The open upright frame $b\ b'$ is braced laterally by obliquely-placed bars, forming a yoke, D, in the form of an inverted V, the arms of which project outward beyond the uprights, and reach downward slightly below the desired point of draft, and are perforated to permit the draft rods or chains E, which are attached to the main frame at a point at or near the axle, to pass through them.

F F represent the tongue or tongue-bars, pivoted to the main frame near the axle, and passing through the lower ends of lever frame-bars $d$, arranged at the sides of, and parallel with, the uprights $b$. These bars $d$ are united at their upper ends by a transverse bar, $d'$, and are adapted to slide on the frame-bars $b$, operated by a lever, G, pivoted in an upright, $g$, on the seat-plank $G'$, which is supported at its forward end by the frame-bar $b'$, and at its rear end by the axle-bar A. The bars F F converge toward their forward ends, where they are connected by an arched yoke, $F'$, rising between the bars F to a height sufficient to permit the unobstructed passage of the stalks, and provided with laterally-projecting arms and rings at $f$, for attachment to the neck-yoke of the horses, which, by this arrangement, are separated, so as to walk upon opposite side of the row of corn operated upon. The arch or yoke $F'$, at its highest point, is coiled to form a ring, $f'$; or, instead of being coiled, the ring may be connected therewith in any suitable way, said ring serving to hold the inner cross-reins which pass through it out of the way of the corn passing under the arch and between the bars F F. The seat-plank $G'$ is slotted longitudinally, to permit the adjustment of the seat forward and backward, for a purpose hereinafter explained.

In suitable bearings on the central sills $a^2$, or on the gatherers $C^1$ mounted thereon, are mounted longitudinal rollers $h\ h^1$, placed parallel with each other, and to both of which a rotary motion upward and outward from each other is imparted by any suitable arrangement of gearing. The bearings of one of these rollers $h$ are secured to the gathering-board $C^1$, which is pivoted at its forward end to the sill, and at its rear end is pressed out toward the roller $h^1$ by a spring at $h^2$, (see dotted lines, Fig. 2,) for keeping the rollers in close proximity with each other, insuring their proper action on the corn, while permitting them to yield and separate for accommodating an increase in the bulk of stalks passing between them. The rollers $h$ $h^1$ (one or both) are provided with a clearer in the form of a spiral rod or rib, so arranged that as the rollers rotate the action of the spiral rib on the corn tends to raise and to move it backward. At the rear ends of the rollers $h$ $h^1$ are stripping-rollers $i$ $i$, placed parallel with each other, and inclining to the rear, as shown in Fig. 3, said rollers being mounted in bearings in the main frame, the bearings of one or both of said rollers being adapted to yield, and held in place by springs for keeping the rollers in close proximity with each other, to insure their proper action on the ears of corn, while permitting them to separate slightly to accommodate an increased bulk of stalks passing between them. The rollers $i$ $i$ (one or both) are provided with flutes or ribs, which, moving inward and backward, serve to grasp the stalks and husks, and to pull them from the ear, which is not permitted to pass between the rollers. The rollers $i$ $i$ are geared together at their upper ends, and are rotated by means of a bevel-pinion at the upper end of roller $i$ engaging with a bevel-wheel on a transverse shaft, I, pinions upon the ends of which, and connected therewith by backing-ratchets, engage with and are operated by spurred rims on the driving-wheels B. Outside of the rollers $h$ $h^1$ on each side, is placed an inclined board, H, upon which the ears fall after being detached from the stalk by the rollers $i$ $i$, and upon these inclined boards are ledges or ribs $k$, which at their rear upper ends are in close proximity to the rollers $h$ $h^1$, and, diverging thence forward, serve to catch the ears after they are detached by the rollers $i$ $i$, and to conduct them into receptacles K, (see Fig. 4,) within which the lower ends of elevators L terminate. These elevators consist of endless belts provided with ribs or buckets $l$, said belts passing around pulleys $L^1$ $L^2$, the former, $L^1$, being a loose pulley mounted in suitable bearings in the pocket or receptacle K, and the latter, $L^2$, being connected with shaft I, and imparting motion to the belts for carrying the corn up from the receptacle K. The buckets $l$ are placed sufficiently far apart on the belts L to accommodate an ear of corn placed lengthwise of the belt between them, and the elevators thus constructed are placed at an angle of forty-five degrees, more or less, from a vertical line inclining to the rear, and the boxes or frames M, inclosing the belts, are covered, as shown at $m$, Fig. 2, to prevent the escape of the ears from the elevating-belt.

At the upper ends of the elevators are inclined chutes N N, for receiving the corn from the elevators and conducting them backward and depositing them in boxes or compartments O O′, these chutes, in this instance, being shown as composed of parallel rollers $n$ $n^1$, inclining downward to the rear, said rollers being geared together at their upper ends, and one of them, $n$, being driven by a bevel-pinion on its upper end from a bevel-wheel on the shaft I, the arrangement of the gears being such as to give to the rollers $o$ $o'$ a movement inward toward each other on their upper faces. These rollers, arranged in pairs for each elevator L, one or both, are flattened at intervals, and are provided on such flattened portions with teeth $n^2$, the flattened part of the roller permitting the ears to descend slightly between the rollers, when the teeth $n^2$ grasp the husks and strip them from the ears. The corn, thus gathered and stripped, is deposited in one of two compartments or boxes, O O′, which are built up each on a pair of sills, $a^1$ $a^2$, leaving an open space, at P, between them for the unobstructed passage of the stalks after the ears have been stripped therefrom by the stripping devices above described. The boxes are oblong in form, reaching at their forward ends under the axle-bar A, and projecting in rear thereof, as shown, any desired distance for giving them the required capacity. When these boxes are empty the preponderance of weight of the machine, owing to the weight of the stripping and elevating mechanism, will be forward of the axle, and the driver's seat will require to be moved well back on the seat-plank G′ for properly balancing the machine; but, owing to the greater capacity of the boxes O O′ in rear of the axle A, as said boxes become filled the preponderance of weight is transferred to the rear of said axle, and it becomes necessary to move the weight of the driver forward, and hence the driver's seat is made adjustable, as explained. The driver, under any adjustment of the seat, through the lever G and lever-frame $d$ $d'$, is enabled to tilt the machine on the axle for adapting the height of the gathering and stripping devices to the condition of the crop operated upon or for passing obstructions.

The stripping-rollers, constructed as described, are formed to act efficiently also in husking the ears as well as in removing them; and for this reason, or if they are not desired, the husking-rollers $n$ $n^1$ may be dispensed with, and a plain box-chute may be used instead.

Where the husking-rollers are used the elevator-belts and inclosing-box should be made narrow, so as only to carry the ears up to and to deliver them upon the husking-rollers endwise, in proper position to be acted upon by said rollers; but where the husker is dispensed with the width of the elevators may be increased, so as to carry up the corn in any relation thereto in which it may be presented.

Having now described my improvement in corn-harvesting machines, what I claim as new therein, and desire to secure by Letters Patent, is—

1. The arch or yoke F, connecting the tongue-bars F F at their forward ends, and provided with the ring $f'$ for the cross-reins, substantially as and for the purpose set forth.

2. The combination, with the upright open frame $b\ b'$, of the inverted V-shaped bracing-yoke D, through the lower extended ends of which the draft rods or chains E pass, substantially as described.

3. The open upright frame $b\ b'$, in combination with the lever-frame $d\ d'$, and the pivoted tongue-bars F F, and lever G, all arranged as described.

4. The combination, with the rollers $h$ and $i$ and the receptacle K, of the inclined planes H, for receiving the ears from the rollers and conducting them to said receptacle, as described.

5. The compartments O O', constructed as described, and separated longitudinally by the central space at P, for permitting the unobstructed passage of the stalks, as described.

CHARLES D. REED.

Witnesses:
WAYLAND S. GOODHUE,
GEO. W. PERKINS.